United States Patent
Xhafa et al.

(10) Patent No.: US 11,528,653 B2
(45) Date of Patent: Dec. 13, 2022

(54) NODE CONFIGURATION AND SELF HEALING FOR AD HOC NETWORKS

(71) Applicant: TEXAS INSTRUMENTS INCORPORATED, Dallas, TX (US)

(72) Inventors: Ariton E. Xhafa, Plano, TX (US); Jianwei Zhou, Allen, TX (US); Xiaolin Lu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 230 days.

(21) Appl. No.: 16/864,405

(22) Filed: May 1, 2020

(65) Prior Publication Data
US 2020/0260360 A1      Aug. 13, 2020

Related U.S. Application Data

(63) Continuation of application No. 15/591,867, filed on May 10, 2017, now Pat. No. 10,681,610.

(60) Provisional application No. 62/346,879, filed on Jun. 7, 2016.

(51) Int. Cl.
| H04W 40/24 | (2009.01) |
| H04L 45/02 | (2022.01) |
| H04W 84/18 | (2009.01) |
| H04B 1/7156 | (2011.01) |
| H04W 84/20 | (2009.01) |

(52) U.S. Cl.
CPC . *H04W 40/248* (2013.01); *H04B 2001/71563* (2013.01); *H04L 45/026* (2013.01); *H04W 84/18* (2013.01); *H04W 84/20* (2013.01)

(58) Field of Classification Search
CPC ... H04W 40/248; H04W 84/18; H04W 84/20; H04L 45/026; H04B 2001/71563
See application file for complete search history.

(56) References Cited

U.S. PATENT DOCUMENTS

| 2013/0107999 | A1 | 5/2013 | Mainaud et al. |
| 2015/0372875 | A1* | 12/2015 | Turon ............ H04W 84/20 370/254 |
| 2017/0251440 | A1 | 8/2017 | Gilson et al. |
| 2018/0049122 | A1 | 2/2018 | Di Marco et al. |

OTHER PUBLICATIONS

IEEE Standard for Local and Metropolitan Area Networks, IEEE Std 802.15.4e—Apr. 2012, Part 15.4: Low-Rate Wireless Personal Area Networks (LR-WRANs), MAC Sublayer, Amendment to IEEE Std. 802.15.4—2011.

* cited by examiner

*Primary Examiner* — Eric Myers
(74) *Attorney, Agent, or Firm* — Valerie M. Davis; Charles A. Brill; Frank D. Cimino

(57) ABSTRACT

A network includes at least one node to communicate with at least one other node via a wireless network protocol. The node includes a network configuration module to periodically switch a current node function of the node between an intermediate node function and a leaf node function. The switch of the current node function enables automatic reconfiguration of the wireless network based on detected communications between the at least one node and at least one intermediate node or at least one leaf node via the wireless network protocol.

10 Claims, 3 Drawing Sheets

NODE CONFIGURATION AND SELF HEALING FOR AD HOC NETWORKS

CROSS-REFERENCE TO RELATED APPLICATION

This application is a Continuation of application Ser. No. 15/591,867 filed May 10, 2017(now patented as U.S. Pat. No. 10,681,610), which claims the benefit of U.S. Provisional Patent Application 62/346,879 filed on Jun. 7, 2016, and entitled "Systems and Methods to Improve Self-Healing and Self-Organization in Wireless Networks", the entirety of which is incorporated by reference herein.

TECHNICAL FIELD

This disclosure relates to networks, and more particularly to network nodes that can automatically change node configuration to facilitate self-healing of an ad hoc wireless network.

BACKGROUND

Network time slotted protocols are widely used to establish communications between network nodes utilizing a predictable time frame slotting technique for nodes to communicate, where each network node communicates according to predefined slots. Such protocols provide scheduled, contention-free channel access to improve throughput performance compared to carrier sense techniques. These protocols are often employed in the formation of ad hoc wireless communications networks, for example. Ad hoc wireless communications networks are formed dynamically as nodes come within range of existing network resources. These networks may be utilized in many applications to provide communications between lower level devices on the networks such as sensors and upper tier devices communicating with the sensors.

In some applications, routing protocols are created that define relationships in the network and how the network operates as conditions change. For example, each node within the network can have a preferred parent node that it can communicate in an upwards direction and possibly having multiple child nodes for downward communications. The parent nodes are sometimes referred to as a root node or intermediate node and the child nodes are sometimes referred to as leaf nodes.

SUMMARY

This disclosure relates to network nodes that can automatically change node configuration to facilitate self-healing of an ad hoc wireless network. In one example, a network includes at least one node to communicate with at least one other node via a wireless network protocol. The node includes a network configuration module to periodically switch a current node function of the node between an intermediate node function and a leaf node function. The switch of the current node function enables automatic reconfiguration of the wireless network based on detected communications between the at least one node and at least one intermediate node or at least one leaf node via the wireless network protocol.

In another example, a method includes configuring at least one node of a wireless network as an intermediate node. The method includes detecting if at least one leaf node is connected to the intermediate node via the wireless network. The method includes switching the intermediate node to a leaf node if no communications are detected with the at least one leaf node after a predetermined time period.

In yet another example, a method includes configuring at least one node of a wireless network as an intermediate node. The method includes detecting if at least one leaf node is connected to the intermediate node via the wireless network. The method includes periodically switching the intermediate node to a leaf node if no communications are detected with the at least one leaf node after a predetermined time period. The method includes periodically switching the leaf node back to the intermediate node to detect if subsequent leaf nodes are present in the wireless network.

DETAILED DESCRIPTION

This disclosure relates to network nodes that can automatically change node configuration to facilitate self-healing and automatic configuration of an ad hoc wireless network. A network configuration module is provided that enables intermediate or leaf nodes in the network to periodically change their function (e.g., from leaf node to intermediate node or vis versa) depending on detected conditions of the network. For example, nodes can initially be configured as an intermediate node that can communicate with one or more other leaf nodes on the network. If no leaf nodes are detected or communications with a known leaf node is not detected by the network configuration module within a given time period, the intermediate node can automatically reconfigure itself as a leaf node to reduce its operating complexity and to conserve power in the network. Conversely, if a leaf node detects that its corresponding intermediate node is no longer active, the leaf node can automatically change its function to an intermediate node and determine if there are other leaf nodes on the network that can communicate to the intermediate node. In this manner, self-healing of the network is provided since if an intermediate node becomes nonoperational, other nodes can automatically reconfigure as the intermediate node as network conditions dictate.

Dynamic or static node configuration can be provided where static node configuration allows a one-time switch from intermediate node functionality to leaf node functionality. Dynamic node configuration allows a node that has switched to a leaf node to periodically switch back to an intermediate node to determine if there are parentless leaf nodes that seek an intermediate node to communicate with. Also, by providing switchable intermediate node and leaf node capability with each respective node on the network, software complexity can be reduced since a single software build can be maintained for both intermediate nodes and leaf nodes.

Figure 1:
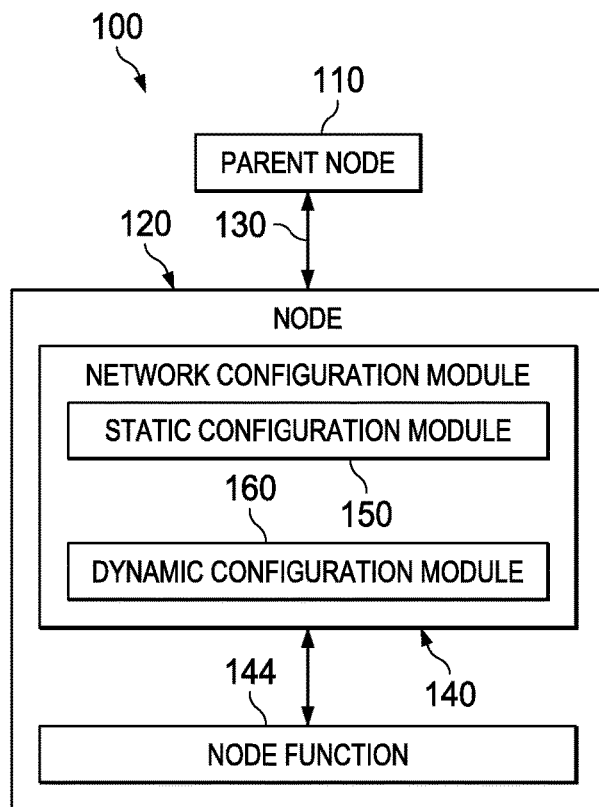
FIG. 1 illustrates an example network where a node can automatically reconfigure its node function to facilitate self-healing of the network.

FIG. 1 illustrates an example network where a node can automatically reconfigure its node function to facilitate self-healing of the network. In this example, the network 100 includes at least two nodes—a parent node 110 and a node 120 that employ a wireless protocol to communicate across a wireless network connection 130. In other examples, more than one node 120 may be employed (see e.g., FIG. 3). Also, other intermediate nodes may exist between the parent node 110 and the node 120, where the intermediate nodes become the parent nodes for the lower-level leaf nodes. In this example, the parent node 110 can be a root node or an intermediate node whereas the node 120 can be an intermediate node or a leaf node. The parent node 110 can transmit a broadcast message from the parent node to the node 120 at predetermined time intervals according to the wireless network protocol. A scheduling packet can be communicated in the broadcast message.

The scheduling packet includes a data field to instruct each node 120 to receive data communicated from the parent node 110 via in a prescribed time slot following the broadcast message and defined by the scheduling packet. The scheduling packet can be embedded or encoded within the broadcast message or can be concatenated along with the broadcast message however the scheduling packet is transmitted within the time slot allocated for the broadcast message. The wireless network protocol can be any time division multiple access protocol (TDMA), such as a time slotted channel hopping (TSCH) protocol specified according to IEEE 801.15.4e, for example. Thus, the broadcast message can be implemented depending on the wireless network protocol that is implemented in the network 100. By way of example, the broadcast message can be a beacon that is periodically transmitted by the parent node 110 as a synchronization phase for a subsequent data transmission phase, for example.

In this example, the network 100 includes at least one node 120 to communicate with at least one other node 120 via a wireless network protocol. The node 120 includes a network configuration module 140 to periodically switch a current node function 144 of the node 120 from an intermediate node function to a leaf node function or from the leaf node function to the intermediate node function. As used herein, the term function refers computer-executable instructions operated by the node 120 (e.g., processor or controller inside the node) which define the node as either an intermediate node or a leaf node. The switch of current node function enables automatic reconfiguration of the wireless network based on detected communications between the node 120 and at least one intermediate node, or between the node 120 and at least one leaf node via the wireless network protocol. The automatic configuration depends on the current node function 144 and various switching conditions that are described herein.

As noted previously, the node 120 can communicate with at least one other node via a time slotted channel hopping protocol as the wireless network protocol however other wireless protocols are possible. In one example, the network configuration module 140 can include a static configuration module 150 that initially configures the node 120 as an intermediate node and periodically switches the node to a leaf node if no leaf node communications are detected with the intermediate node. For example, the static configuration module 150 can start a timer for a predetermined period and switch the intermediate node to the leaf node via the node function 144 at the end of the predetermined period if no leaf node communications are detected with the intermediate node.

In another example, the network configuration module 140 can include a dynamic configuration module 160 that initially configures the node 120 as an intermediate node and periodically switches the node to a leaf node if no leaf node communications are detected with the intermediate node. The dynamic configuration module 160 then periodically switches the leaf node back to the intermediate node to determine if subsequent leaf nodes are present on the network. The network configuration module 140 can include a user setting (e.g., switch or software setting) to enable or disable the static configuration module 150 or the dynamic configuration module 160 to facilitate static or dynamic mode selection of the network configuration module 140.

The dynamic configuration module 160 can utilize a dynamic parameter that defines a time percentage (e.g., 10%) of a given time period (e.g., 1 hour) that the node 120 functions as the intermediate node. The dynamic configuration module 160 holds the node 120 as the intermediate node for the time percentage and switches the node from the intermediate node to the leaf node if there are no leaf nodes connected to the intermediate node. After each given time period, the dynamic configuration module can switch the node 120 to the intermediate node for the time percentage to detect if other leaf nodes are present. In another example, the dynamic configuration module 160 adjusts the dynamic parameter by a given time amount over a number of intervals of the given time period if no leaf nodes are detected (e.g., adjust the time percentage from a high of 90% and reduce time percentage by half each time interval). The dynamic configuration module 160 can continue to adjust the dynamic parameter over the number of intervals until a minimum threshold time percentage is achieved (e.g., no lower than 5%).

In yet another example, the dynamic configuration module can include a keep alive timer to monitor the node 120 as the intermediate node. If there is no communications detected by the intermediate node with the leaf node within a time period defined by the keep alive timer, the dynamic configuration module 160 can switch the at least one node 120 from the intermediate node to the leaf node. To facilitate that a leaf node will see a beacon that is transmitted over the wireless network 130, the dynamic configuration module 160 can define a time interval when the node 120 is configured as the leaf node, where the time interval is set to about the time of a beacon interval associated with the wireless network protocol.

Figure 2:
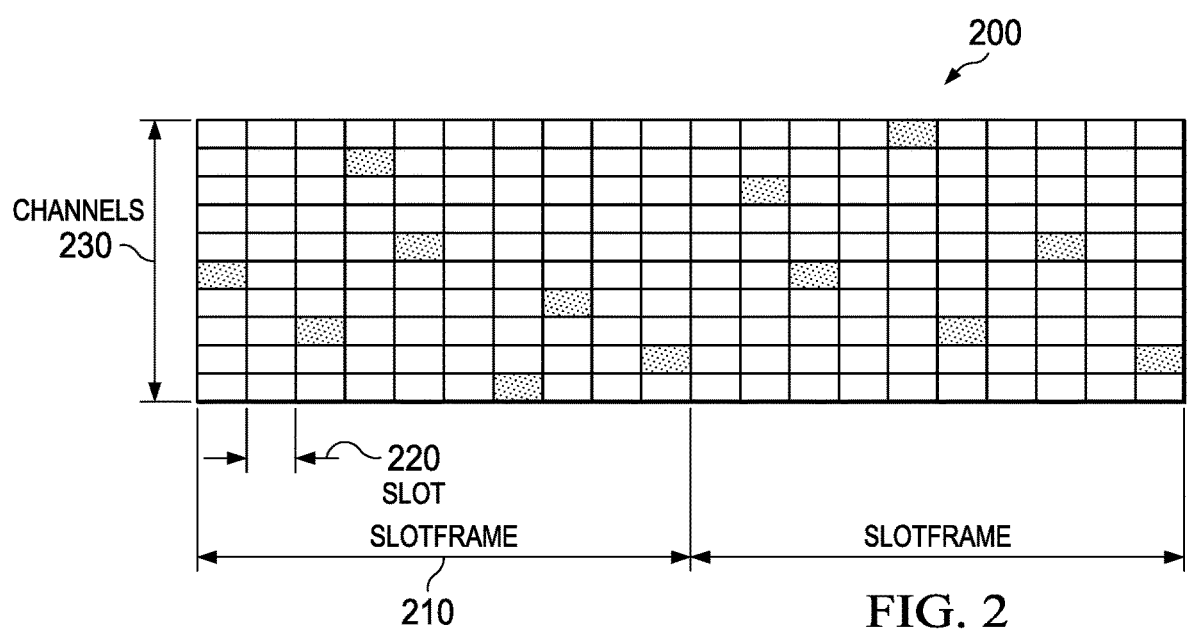
FIG. 2 illustrates an example of a network protocol for a self-healing network that utilizes channels, slot frames and time slots.

FIG. 2 illustrates an example of a network protocol diagram 200 for a self-healing network that utilizes channels, slot frames and time slots. As used herein, the term time slot refers to a designated period of time in a communications frame where a given node can receive or transmit data, where a frame is a basic unit of data transport that includes a set of contiguous time-slots transmitted according to a fixed schedule that repeats over time. Some time slots in the frame are reserved for beacon communications and some time slots are shared meaning that any node can transmit data during a shared time slot. Shared time slots are also referred to as contention slots since multiple nodes can conflict with each other if each node transmits data during the shared slot. Other time slots are specifically reserved as receive time slots and transmit time slots for each respective node.

The diagram 200 describes the mode of operation for a time slotted channel hopping (TSCH) media access control (MAC) although other protocols are possible. Time consists of a slot frame 210, where each slot frame consists of timeslots (or slots) 220. The communication between the nodes in the network occur during the timeslots 220, although, it can happen at different channels shown at 230. For example, if node A and node B are assigned slot 3 in slot frame 1, the channel that they are communicating in this slot frame is channel 3. However, in slot frame 2, the timeslot number is the same; however, the channel number is 5 this time. Note that beacons are transmitted not only by the root node, but also by the intermediate nodes (see e.g., FIG. 3 for illustration of these nodes). In current networks, there is a clear distinction in functionality between intermediate and leaf nodes. In the networks and methods described herein, a respective node can be an intermediate node or a leaf node depending on detected conditions of the network. This facilitates providing a single software build to support both network nodes and their respective functionality which simplifies software design and reduces costs since separate software builds for the respective nodes no longer have to be supported.

Figure 3:
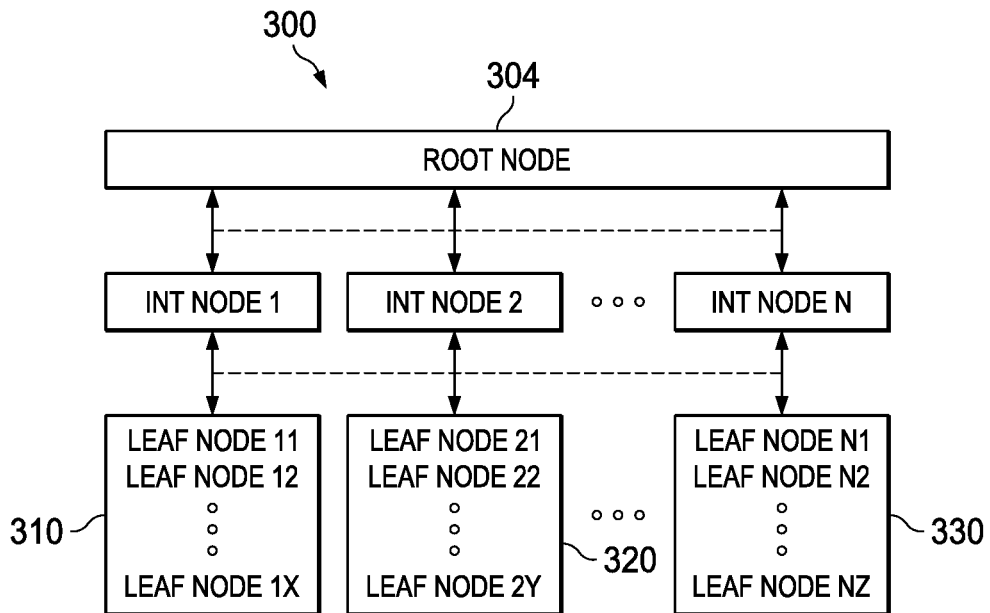
FIG. 3 illustrates an example network configuration having multiple intermediate and leaf nodes that can periodically change node functionality.

FIG. 3 illustrates an example network configuration 300 having multiple intermediate and leaf nodes that can periodically change node functionality. A top level in the network 300 can include a root node 304 which serves as a parent node to one or more intermediate nodes shown as INT NODE 1 though INT NODE N, where N is a positive integer. Thus, each of the intermediate nodes can be viewed as a child node of the parent nodes. In turn, each of the intermediate nodes 1 though N can have one or more leaf nodes attached thereto. For example, at 310, leaf nodes 11 through 1X can report to intermediate node 1 operating as a parent node, where X is a positive integer. At 320, leaf nodes 21 through 2Y can report to intermediate node 2 operating as a parent node, where Y is a positive integer. At 330, child nodes N1 through NZ can report to intermediate node N operating as a parent node, where N and Z are positive integers.

A dashed line is shown between nodes at the intermediate level and another dashed line is shown between nodes at the child level, where the dashed line represents that some nodes may be able to communicate between other members at a common hierarchy level and some nodes may not be able to communicate at the common level. In some network examples, intermediate nodes and/or leaf nodes may communicate with other nodes at their respective hierarchy levels depending on network topologies and network device locations. In other examples, communications can be routed to/from the respective leaf nodes, through the intermediate nodes, to the root node 304 in order to route messages from one node in the network to another node in the network that is not in the same linear path as a the respective root node, intermediate node, and child node.

The network 300 can be provided as a multi-hop wireless network that consists of the root node 304, intermediate nodes, and leaf nodes. The root node 304 connects the network to an internal or external network. The intermediate nodes connects the leaf nodes (and other intermediate nodes) to the root node and from there to the internal/external network. The definition of leaf nodes here is that there are no other nodes connected to these nodes. Conventional software builds for the intermediate and leaf nodes are done separately. For example: in beacon channel hopping networks, a coordinator transmits periodic beacons that contain information to facilitate nodes joining and communicating in the network. The information contained in the beacon could be the channels to be used at a specific time, timing information when this beacon is sent, link information, and so forth.

To transmit data in these networks, the nodes can then use the link information, which can be a pair of (channel, time) to communicate and send data to their neighbors. Intermediate nodes also transmit beacons and in these beacons, the same information that was sent by the coordinator is repeated. This is to allow other intermediate and leaf nodes to connect to the network. However, conventional leaf nodes do not transmit beacons as they have a simple software build in order to save memory and provide power efficiency. The networks and methods described herein provide a single software image for both intermediate and leaf nodes. This reduces complexity of software maintenance, while also providing the network the flexibility to be self-healing (e.g., when an intermediate node goes down, another leaf node in the vicinity can take over and perform the same tasks as the previous intermediate node).

Figure 4:
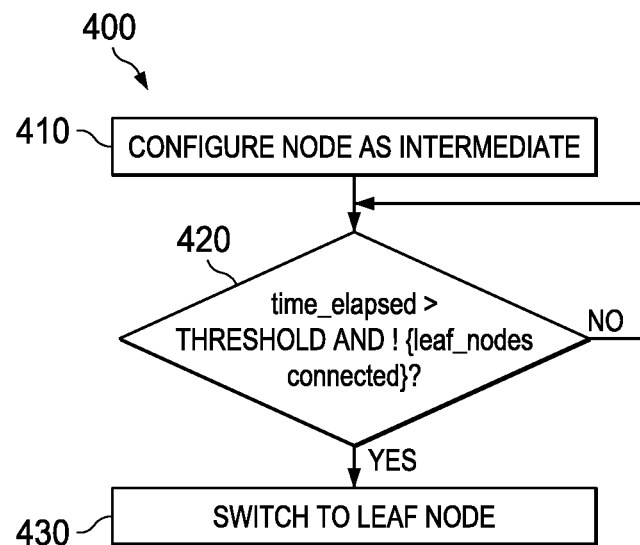
FIG. 4 illustrates an example method that employs a static reconfiguration of a network to facilitate self-healing of the network.
Figure 5:
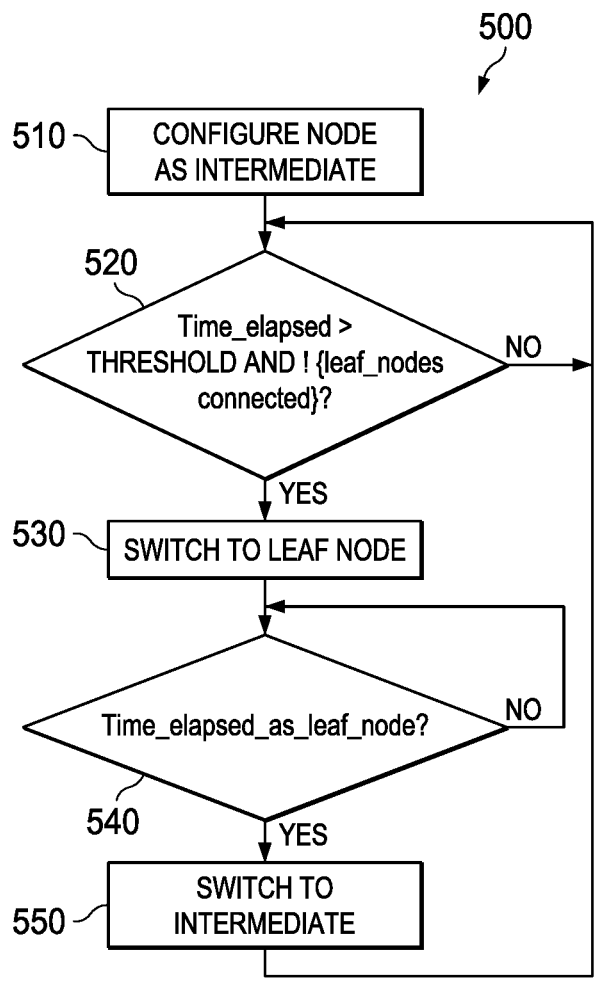
FIG. 5 illustrates an example method that employs a dynamic reconfiguration of a network to facilitate self-healing of the network.

In view of the foregoing structural and functional features described above, example methods will be better appreciated with reference to FIGS. 4 and 5. While, for purposes of simplicity of explanation, the methods are shown and described as executing serially, it is to be understood and appreciated that the methods are not limited by the illustrated order, as parts of the methods could occur in different orders and/or concurrently from that shown and described herein. Such methods can be executed by various components configured in an IC or a processor, for example.

FIG. 4 illustrates an example method 400 that employs a static reconfiguration of a network to facilitate self-healing of the network. At 410, a method 400 includes configuring at least one node of a wireless network as an intermediate node (e.g., via network configuration module 140 of FIG. 1). At 420, the method 400 includes detecting if at least one leaf node is connected to the intermediate node via the wireless network (e.g., via network configuration module 140 of FIG. 1). This can include determining if a predetermined time has elapsed and if at least one leaf node is present. If these conditions are not met at 420, the method proceeds back to 420. If the conditions of 420 are met, the method 400 includes switching the intermediate node to a leaf node if no communications are detected with the leaf node after a predetermined time period (e.g., via static configuration module 150 of FIG. 1). The node can communicate via a time slotted channel hopping protocol across the wireless network (or other wireless protocol). In this example, each node, except the root, starts as an intermediate node. An intermediate node then becomes a leaf node for example, 1 hour after the node joins the network and provided it does not receive any data forwarding request from any other nodes. This network is thus self-healing and self-configurable.

FIG. 5 illustrates an example method 500 that employs a dynamic reconfiguration of a network to facilitate self-healing of the network (e.g., via network configuration module 140 of FIG. 1). At 510, the method 500 includes configuring at least one node of a wireless network as an intermediate node. At 520, the method 500 includes detecting if at least one leaf node is connected to the intermediate node via the wireless network (e.g., via network configuration module 140 of FIG. 1). This can include determining if a predetermined time has elapsed and if at least one leaf node is not present. If these conditions are not met at 520, the method proceeds back to 520. If the conditions of 520 are met, the method 500 includes switching the intermediate node to a leaf node at 530 if no communications are detected with the leaf node after a predetermined time period (e.g., via dynamic configuration module 160 of FIG. 1). At 540, the method 500 includes detecting if a predetermined time period has elapsed (e.g., via dynamic configuration module 160 of FIG. 1). If the time period has not elapsed at 540, the method proceeds back to 540. If the time period has elapsed at 540, the method 500 includes periodically switching the leaf node back to the intermediate node at 550 to detect if subsequent leaf nodes are present in the wireless network (e.g., via dynamic configuration module 160 of FIG. 1). As noted previously, the nodes can communicate via a time slotted channel hopping protocol across the wireless network, for example.

Although not shown, the method 500 can include utilizing a dynamic parameter that defines a time percentage of a given time period that the node functions as the intermediate node. This can include holding the node as the intermediate node for the time percentage, switching the node from the intermediate node to the leaf node if there are no leaf nodes connected to the intermediate node, and after each given time period, switching the node to the intermediate node for the time percentage to detect if other leaf nodes are present. The method 500 can include adjusting the dynamic parameter by a given time amount over a number of intervals of the given time period if no leaf nodes are detected. This can include adjusting the dynamic parameter over the number of intervals until a minimum threshold time percentage is achieved. The method 500 can also include monitoring the node as the intermediate node and if there is no communications detected by the intermediate node with the leaf node within a time period defined by a keep alive timer, then switching the node from the intermediate node to the leaf node. The method can also include defining a time interval when the node is configured as the leaf node, where the time interval is set to about the time of a beacon interval associated with the wireless network.

In the dynamic switching example of the method 500, the intermediate node can switch back and forth between being an intermediate and leaf node. Switching rules can be described as: Always starts as an intermediate node; Switch to leaf node if there are no leaf nodes connected; Switch back to intermediate node based on the rules; Stay for a period of time, then go back to leaf node if there are no leaf nodes connected and Repeat the dynamic method. Given the time gap, or the time that the node operates in leaf mode, this can impact the scanning of the leaf nodes trying to connect to this node since their respective intermediate node went offline. On/off intervals can be employed for switching with an on interval being beacon interval and off intervals being min (node_intermediate, node_leaf).

By way of example, assume that every hour (or every 2 minutes), the node switches between intermediate and leaf depending on a dynamic factor parameter. Thus, if the dynamic factor is 0.2, it controls that 20% of the time in 1 hour (or other time interval), the node operates as an intermediate node. This includes the following dynamic behavior: Dynamic node starts as an intermediate node. Assuming a dynamic factor of 10%, it stays as intermediate node for 360 seconds, then switches to leaf node if there are no leaf nodes connected to it. After 1 hour (or other interval) elapses, it switches to intermediate node for another 360 sec and so on. In an alternative, the dynamic node starts with 90% dynamic factor. If no leaf node connects, it reduces by half. If no node connects again, it reduces by half and so on, till it reaches its minimum threshold (e.g., dynamic factor configured to, 10%).

When a dynamic node switches to intermediate node and a leaf node connects to it and stays connected, the dynamic node shall stay in intermediate mode. If leaf node does not have a communication with the intermediate node for a time that exceeds (e.g., 5*KeepAlive timer), the dynamic node shall delete the link and can switch to leaf mode when suitable. Leaf node scanning can be performed such its detection interval is the same (or similar) as beacon interval. The off time interval is the same as dynamic_factor*dynamic_interval−beacon_interval, for example.

Figure 6:
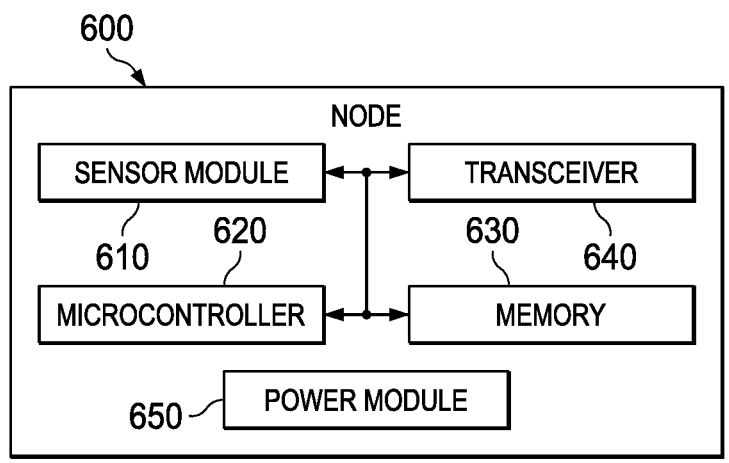
FIG. 6 illustrates an example node that can automatically reconfigure its node function to facilitate self-healing of a network.

FIG. 6 illustrates an example node 600 that can automatically reconfigure its node function to facilitate self-healing of a network. The example node 600 can be employed as part of a wireless sensor network (WSN) or system that contains a plurality (even hundreds of thousands) of sensor nodes. Such network/system examples where the node 600 can be implemented are shown with respect to FIGS. 1 and 3. Each node 600 can be equipped with a sensor module 610 to detect physical phenomena such as light, heat, pressure, and so forth. The sensor nodes in the WSN can communicate among themselves via radio signals utilizing substantially any wireless protocol such as Bluetooth, Bluetooth Low energy (BLE), WIFI, IEEE 802.11, and Worldwide Interoperability for Microwave Access (WiMAX) protocol, for example. The individual nodes in the WSN are inherently resource constrained, thus they tend to be limited in processing speed, storage capacity, and communication bandwidth. After the sensor nodes are deployed, they are responsible for self-organizing an appropriate network infrastructure often with multi-hop communication with them. The working mode of the sensor nodes may be either continuous or event driven for example.

Wireless sensor networks are spatially distributed autonomous sensors to monitor physical or environmental conditions, such as temperature, sound, pressure, and so forth and to cooperatively pass their data through the network to a main location. The more modern networks are bi-directional, also enabling control of sensor activity. The WSN is built of "nodes," where each node 600 is connected to one (or sometimes several) sensors. The WSN's can include ad-hoc networks where nodes can connect and leave the network dynamically. The node 600 generally includes a microcontroller 620, memory 630 (e.g., ferroelectric random access memory (FRAM)), wireless transceiver 640 (e.g., Texas Instrument CC2500 2.4 GHz RF transceiver), power module 650 (e.g., Texas Instrument BQ25504), along with the sensor module 610 (e.g., temperature detector, infrared detector, input/output module, analog conversion module). Intermediate nodes and child nodes generally share the same hardware and software but change their status (intermediate/child) depending if they are configured per a given communications layer operating with the node memory 630 and/or transceiver 640 such as a routing layer or a network layer, for example. A root node may have one additional level of capability over the intermediate/child nodes which is the ability to connect to other larger/broader networks such as the Internet.

Size and cost constraints on sensor nodes result in corresponding constraints on resources such as energy, memory, computational speed, and communications bandwidth. The topology of the WSNs can vary from a simple star network to an advanced multi-hop wireless mesh network. The propagation technique between the hops of the network can be routing or flooding. Software is typically reduced in complexity to conserve power on respective sensor nodes. Examples of node operating software systems can include TI-RTOS, TinyOS, LiteOS, and Contiki, for example. Other sensor nodes may operate as embedded systems without the use of a given operating system. The self-healing and node configuration capabilities described herein can be executed by the microcontroller 620 as executable instructions operating within the memory 630. In an alternative example, the microcontroller 620, memory, transceiver 640, and/or sensor module 610, can be implemented as an application specific integrated circuit.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An apparatus, comprising:
    circuitry for operating as a node in a communications network, the node includes:
        circuitry for configuring the node as an intermediate node;
        circuitry for switching the intermediate node to a leaf node if no leaf node communications from at least one other node are detected by the intermediate node after a predetermined time period;
        circuitry for periodically switching the leaf node back to the intermediate node to determine if at least one subsequently detected parentless node is present on the network;
        circuitry for becoming the parent node of the subsequently detected parentless node;
        circuitry for maintaining the node as an intermediate node while parent to the subsequently detected node; and
        circuitry for switching the intermediate node back to the leaf node if the intermediate node is no longer a parent node to any node and no newly detected parentless nodes are detected.

2. The apparatus of claim 1, wherein the node communicates with at least one other node via a time slotted channel hopping protocol as the wireless network protocol.

3. The apparatus of claim 1, wherein a static configuration module initially configures the node as an intermediate node and periodically switches the node to a leaf node if no leaf node communications are detected with the intermediate node.

4. The apparatus of claim 3, wherein the static configuration module starts a timer for the predetermined period and switches the intermediate node to the leaf node at the end of the predetermined period if no leaf node communications are detected with the intermediate node.

5. The apparatus of claim 1, wherein a dynamic configuration module initially configures the node as an intermediate node and periodically switches the node to a leaf node if no leaf node communications are detected with the intermediate node, the dynamic configuration module periodically switches the leaf node back to the intermediate node to determine if subsequently detected parentless leaf nodes are present on the network.

6. The apparatus of claim 5, wherein the static configuration module or the dynamic configuration module is user modifiable.

7. The apparatus of claim 5, wherein the dynamic configuration module utilizes a dynamic parameter that defines a time percentage of a given time period that the node functions as the intermediate node, wherein the dynamic configuration module holds the node as the intermediate node for the time percentage and switches the node from the intermediate node to the leaf node if there are no leaf nodes connected to the intermediate node, after each given time period, the dynamic configuration module switches the node to the intermediate node for the time percentage to detect if other leaf nodes are present.

8. The apparatus of claim 5, wherein the dynamic configuration module adjusts the dynamic parameter by a given time amount over a number of intervals of the given time period if no leaf nodes are detected, the dynamic configuration module adjusts the dynamic parameter over the number of intervals until a minimum threshold time percentage is achieved.

9. The apparatus of claim 7, wherein the dynamic configuration module includes a keep alive timer to monitor the node as the intermediate node, if there is no communications detected by the intermediate node with the leaf node within a time period defined by the keep alive timer, the dynamic configuration module switches the node from the intermediate node to the leaf node.

10. The apparatus of claim 1, wherein the dynamic configuration module defines a time interval when the node is configured as the leaf node, where the time interval is set to the time of a beacon interval associated with the wireless network protocol.

* * * * *